United States Patent
Ma et al.

(10) Patent No.: US 9,442,741 B2
(45) Date of Patent: Sep. 13, 2016

(54) METHOD, TERMINAL, SERVER, AND SYSTEM FOR DATA PROCESSING

(71) Applicant: TENCENT TECHNOLOGY (SHENZHEN) COMPANY LIMITED, Shenzhen (CN)

(72) Inventors: Liang Ma, Shenzhen (CN); Zhiqiang He, Shenzhen (CN); Chunhua Luo, Shenzhen (CN); Fajiang He, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 146 days.

(21) Appl. No.: 14/301,430

(22) Filed: Jun. 11, 2014

(65) Prior Publication Data
US 2014/0344476 A1    Nov. 20, 2014

Related U.S. Application Data

(63) Continuation of application No. PCT/CN2013/090002, filed on Dec. 19, 2013.

(30) Foreign Application Priority Data

May 15, 2013   (CN) .......................... 2013 1 0179934

(51) Int. Cl.
*G06F 15/16* (2006.01)
*G06F 9/44* (2006.01)

(52) U.S. Cl.
CPC .................. *G06F 9/4411* (2013.01)

(58) Field of Classification Search
CPC .. G06F 9/4415; G06F 9/4411; H04L 45/563; H04L 12/771
See application file for complete search history.

(56) References Cited

U.S. PATENT DOCUMENTS

| | | | | |
|---|---|---|---|---|
| 6,668,376 | B1* | 12/2003 | Wang | G06F 9/4415 710/8 |
| 6,772,420 | B1* | 8/2004 | Poger | G06F 9/4411 709/220 |
| 2002/0095501 | A1* | 7/2002 | Chiloyan | G06F 9/4415 709/227 |
| 2004/0088180 | A1* | 5/2004 | Akins, III | H04N 7/17318 709/217 |

(Continued)

FOREIGN PATENT DOCUMENTS

| | | |
|---|---|---|
| CN | 1581137 A | 2/2005 |
| CN | 1959658 A | 5/2007 |

(Continued)

OTHER PUBLICATIONS

The World Intellectual Property Organization (WIPO) International Search Report for PCT/CN2013/090002 Mar. 27, 2014.

(Continued)

*Primary Examiner* — Cheikh Ndiaye
(74) *Attorney, Agent, or Firm* — Anova Law Group, PLLC

(57) ABSTRACT

Methods, terminals, servers, and systems for data processing are provided. After establishing a connection with a first terminal, a second terminal obtains identification information of the first terminal and sends a driving request containing the identification information of the first terminal to a back-end server, such that the back-end server determines for the first terminal a driving data address matched with the identification information of the first terminal according to the identification information. The second terminal receives the driving data address sent from the back-end server, and obtains driving data corresponding to the driving data address. The second terminal sends the driving data to the first terminal for the first terminal to load the driving data.

20 Claims, 6 Drawing Sheets

(56) References Cited

U.S. PATENT DOCUMENTS

| | | | | |
|---|---|---|---|---|
| 2004/0254013 | A1* | 12/2004 | Quraishi | G07F 17/32 |
| | | | | 463/29 |
| 2005/0267964 | A1* | 12/2005 | Kech | G06F 8/65 |
| | | | | 709/223 |
| 2013/0080659 | A1* | 3/2013 | Seo | G06F 13/10 |
| | | | | 710/5 |
| 2013/0311987 | A1* | 11/2013 | Liekens | G06F 9/445 |
| | | | | 717/178 |

FOREIGN PATENT DOCUMENTS

| | | |
|---|---|---|
| CN | 101142804 A | 3/2008 |
| CN | 101382894 A | 3/2009 |
| CN | 102385523 A | 3/2012 |
| CN | 103019751 A | 4/2013 |
| CN | 103279370 A | 9/2013 |

OTHER PUBLICATIONS

The State Intellectual Property Office of the People's Republic of China (SIPO) Office Action 1 for 201310179934.1 Mar. 25, 2014.
The State Intellectual Property Office of the People's Republic of China (SIPO) Office Action 2 for 201310179934.1 Jul. 29, 2014.
The State Intellectual Property Office of the People's Republic of China (SIPO) Office Action 3 for 201310179934.1 Oct. 8, 2014.
The State Intellectual Property Office of the People's Republic of China (SIPO) Office Action 4 for 201310179934.1 Feb. 5, 2015.

* cited by examiner

METHOD, TERMINAL, SERVER, AND SYSTEM FOR DATA PROCESSING

CROSS-REFERENCES TO RELATED APPLICATIONS

This application is a continuation application of PCT Patent Application No. PCT/CN2013/090002, filed on Dec. 19, 2013, which claims priority to Chinese Patent Application No. 2013101799341 filed on May 15, 2013, the entire contents of all of which are incorporated herein by reference.

FIELD OF THE DISCLOSURE

The disclosure relates to the field of communication technology and, more particularly, relates to methods, terminals, servers, and systems for data processing.

BACKGROUND

Currently, when a user wants to load a game onto a mobile phone, the user needs to use a computer to download the game, to use a universal serial bus (USB) to connect the computer with the mobile phone, and to move the game from the computer to the mobile phone. In addition, before loading the game, the vendor identity and product identity of the mobile phone need to be determined and then driver software matched with the vendor identity and product identity can be determined. After the mobile phone downloads and loads the driver software, the game software can be loaded to the mobile phone.

However, when loading the driver software onto the mobile phone, the operation is often complicated with high complexity. In addition, if a user has any difficulties on how to load driver software to the mobile phone, it is impossible to load the driver software and also the game software.

BRIEF SUMMARY OF THE DISCLOSURE

One aspect of the present disclosure includes a data processing method. After establishing a connection with a first terminal, a second terminal obtains identification information of the first terminal and sends a driving request containing the identification information of the first terminal to a back-end server, such that the back-end server determines for the first terminal a driving data address matched with the identification information of the first terminal according to the identification information. The second terminal receives the driving data address sent from the back-end server, and obtains driving data corresponding to the driving data address. The second terminal sends the driving data to the first terminal for the first terminal to load the driving data.

Another aspect of the present disclosure includes a data processing method. Identification information of a first terminal sent from a second terminal is received. A driving data address matched with the identification information of the first terminal is determined for the first terminal according to the identification information. The driving data address is sent to the second terminal for the second terminal to obtain driving data corresponding to the driving data address.

Another aspect of the present disclosure includes a terminal including an obtaining unit, a first sending unit, and a first receiving unit. The obtaining unit is configured to obtain identification information of a first terminal after establishing a connection with the first terminal. The first sending unit is configured to send the identification information of the first terminal obtained by the obtaining unit to the back-end server such that the back-end server determines a driving data address matched with the identification information of the first terminal according to the identification information. The first receiving unit is configured to receive the driving data address sent from the back-end server. The obtaining unit is further configured to obtain driving data corresponding to the driving data address received by the first receiving unit. The first sending unit is further configured to send the driving data to the first terminal for the first terminal to load the driving data.

Another aspect of the present disclosure includes a server including a second receiving unit, a determining unit, and a second sending unit. The second receiving unit is configured to receive identification information of first terminal sent from a second terminal. The determining unit is configured to determine for the first terminal a driving data address matched with the identification information of the first terminal according to the identification information received by the second terminal. The second sending unit is configured to send the driving data address determined by the determining unit to the second terminal for the second terminal to obtain driving data corresponding to the driving data address.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

Methods, terminals, servers, and systems for data processing are provided, for example, as shown in FIGS. 1-11. Complexity of loading driving data on a terminal can be reduced. The disclosed methods, apparatus and systems can be implemented in a suitable environment and/or using a computer-based system.

Figure 12:
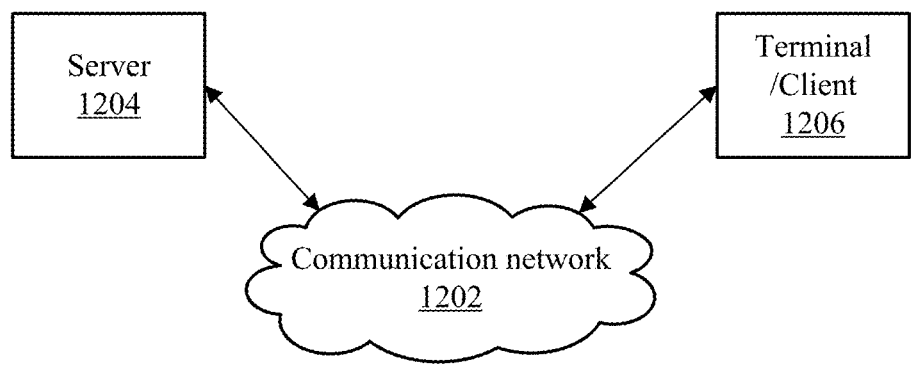
FIG. 12 depicts an exemplary environment incorporating certain disclosed embodiments.

For example, FIG. 12 depicts an exemplary environment 1200 incorporating certain disclosed embodiments. As shown in FIG. 12, environment 1200 may include a server 1204, a terminal (or client device) 1206, and/or a communication network 1202. The server 1204 and the client 1206 may be coupled through the communication network 1202 for information exchange, such as obtaining web data. Although only one terminal 1206 and one server 1204 are shown in the environment 1200, any number of terminals 1206 or servers 1204 may be included, and other devices may also be included.

Communication network 1202 may include any appropriate type of communication network for providing network connections to the server 1204 and terminal 1206 or among multiple servers 1204 or terminals 1206. For example, communication network 1202 may include the Internet or other types of computer networks or telecommunication networks, either wired or wireless.

A terminal, as used herein, may refer to any appropriate user terminal with certain computing capabilities, such as a personal computer (PC), a work station computer, a hand-held computing device (tablet), a smart phone or mobile phone, or any other user-side computing device. A server, as used herein, may refer to one or more server computers configured to provide certain server functionalities, such as database management and search engines. A server may also include one or more processors to execute computer programs in parallel. In one embodiment, the server can be used as a back-end server as desired. Server 1204 and/or terminal 1206 may be implemented on any appropriate computing platform.

The disclosed methods for data processing can reduce complexity of loading driving data on a first terminal. An exemplary first terminal can include a mobile phone, a tablet computer, a PDA (personal digital assistant) or any suitable mobile devices. An exemplary second terminal can include a laptop, a personal computer (PC), a POS (point of sales), a car-carrying-computer, or any suitable communication devices. Of course, the first and/or second terminals are not limited in any means in the present disclosure, for example, the second terminal can be a mobile phone.

Figure 1:
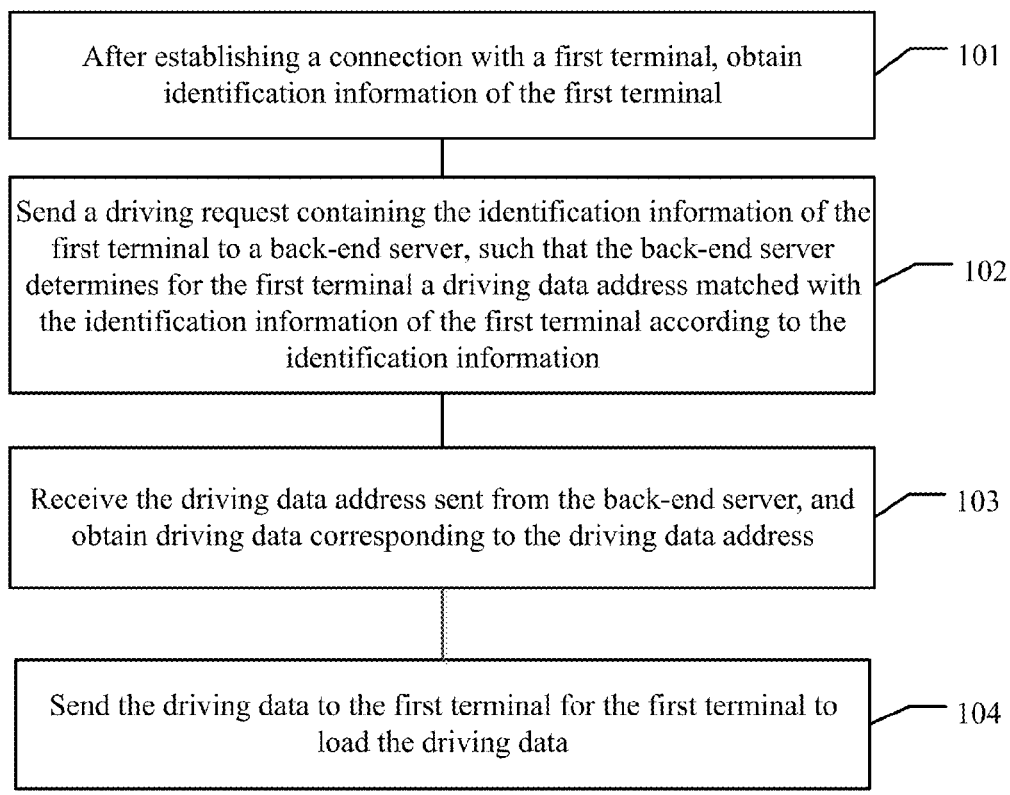
FIG. 1 is a schematic of an exemplary method for data processing in accordance with various embodiments.

FIG. 1 is a schematic of an exemplary method for data processing in accordance with various embodiments.

In Step 101, after establishing a connection with a first terminal, a second terminal obtains identification information of the first terminal.

In various embodiments, the identification information of the first terminal can include one or more of a vendor identity (VID), a product identity (PID), and/or other information of the first terminal.

The obtaining step can include: the second terminal uses a USB device interface to read a device descriptor and an interface descriptor, and, from these data structures, to read the VID and/or PID of the first terminal that is connected with the second terminal.

In various embodiments, the VID and PID of the first terminal can be used as an index. According to the VID and PID of the first terminal, a back ground server can search for information corresponding to the VID and PID in a pre-set mapping table. The identification information of the first terminal can further be a unique identification of the first terminal.

In Step 102, the second terminal sends a driving request containing the identification information of the first terminal to a back-end server, such that the back-end server determines for the first terminal a driving data address matched with the identification information of the first terminal according to the identification information.

In Step 103, the second terminal receives the driving data address sent from the back-end server, and obtains driving data corresponding to the driving data address.

The back-end server can return the driving data address requested by the second terminal to the second terminal. The second terminal can obtain driving data corresponding to the driving data address from the back-end server or other server that stores the driving data.

In Step 104, the second terminal sends the driving data to the first terminal for the first terminal to load the driving data.

As disclosed, after establishing a connection with a first terminal, a second terminal can obtain identification information of the first terminal and send a driving request containing the identification information of the first terminal to a back-end server, such that the back-end server determines for the first terminal a driving data address matched with the identification information of the first terminal according to the identification information. The second terminal can receive the driving data address sent from the back-end server, obtain driving data corresponding to the driving data address, and send the driving data to the first terminal for the first terminal to load the driving data. Compared with conventional technology for loading driving data, the disclosed method can decrease complexity for loading the driving data of the first terminal.

Optionally, referring back to FIG. 1, the exemplary method for data processing can further include: after the first terminal successfully loads the driving data, sending a loading success notification message the back-end server such that when the back-end server determines that the identification information of the first terminal is not stored, the back-end server correlates the identification information of the first terminal with the driving data address, and stores the correlated identification information and the driving data address.

In various embodiments, the driving data sent from the second terminal to the first terminal may not completely match with the hardware type of the first terminal. The driving data then may or may not be successfully loaded. When successfully loaded, the driving data is indicated to be matched with the hardware type of the first terminal. In some cases, the back-end server may have saved the mapping relationship between the VID/PID of the first terminal and the driving data address and there is no need to store the mapping relationship on the back-end server. In other cases, the back-end server may not have saved the mapping relationship between the VID/PID of the first terminal and the driving data address and there is a need to store the mapping relationship on the back-end server for next use.

Optionally, referring back to FIG. 1, the exemplary method for data processing can further include: after the first terminal fails to load the driving data, sending a loading failure notification message to the back-end server such that the back-end server determines a back-up driving data address matched with the identification information of the first terminal according to the identification information of the first terminal. The second terminal can then receive the back-up driving data address sent from the back-end server and obtain back-up driving data corresponding to the back-up driving data address. The second terminal can send the back-up driving data to the first terminal for the first terminal to load the back-up driving data.

In various embodiments, when the first terminal fails to load the driving data, the driving data is not indicated to be matched with the first terminal. When receiving the loading failure notification message, the back-end server can determine the back-up driving data address matched with the VID/PID according to the VID/PID of the first terminal, such that the back-up driving data corresponding to the back-up driving data address can be loaded by the first terminal.

Optionally, referring back to FIG. 1, the exemplary method for data processing can further include: obtaining a resolution of the first terminal from an operation system server; obtaining data to be loaded corresponding to the resolution and an identification of the data to be loaded, according to the resolution of the first terminal and the data to be loaded; and sending the data to be loaded to the first terminal for the first terminal to load the data to be loaded.

In various embodiments, the operation system server can be an android server, and can communicate with each of the first terminal and the second terminal. The operation system server can obtain a first terminal resolution from the first terminal, and the first terminal resolution can be obtained by the second terminal from the operation system server. The second terminal can first determine whether the data to be loaded to the first terminal matches the first terminal resolution. When it is determined that is not matched, the second terminal can download the data corresponding to the first terminal resolution and the identification of the data to be loaded from a server that stores the data to be loaded, according to the first terminal resolution. The second terminal can then send the data to be loaded to the first terminal for the first terminal to load the data to be loaded.

Optionally, referring back to FIG. 1, the exemplary method for data processing can further include: obtaining one or more descriptors of the first terminal from an operation system server; and sending the one or more descriptors to the back-end server for the back-end server to correlate the identification information of the first terminal with at least one descriptor of the one or more descriptors and to store the correlated identification information and the at least one descriptor.

In various embodiments, the descriptor of the first terminal includes: a first terminal mode, a first terminal type, a first terminal brand name, a first terminal device type, a first terminal resolution, a first terminal operation system, and/or a first terminal CPU number of bits.

The back-end server can store the mapping relationship table between the driving data address and the VID/PID, and can also store a mapping relationship table between at least one of the VID/PID and at least one descriptor of the first terminal.

Figure 2:
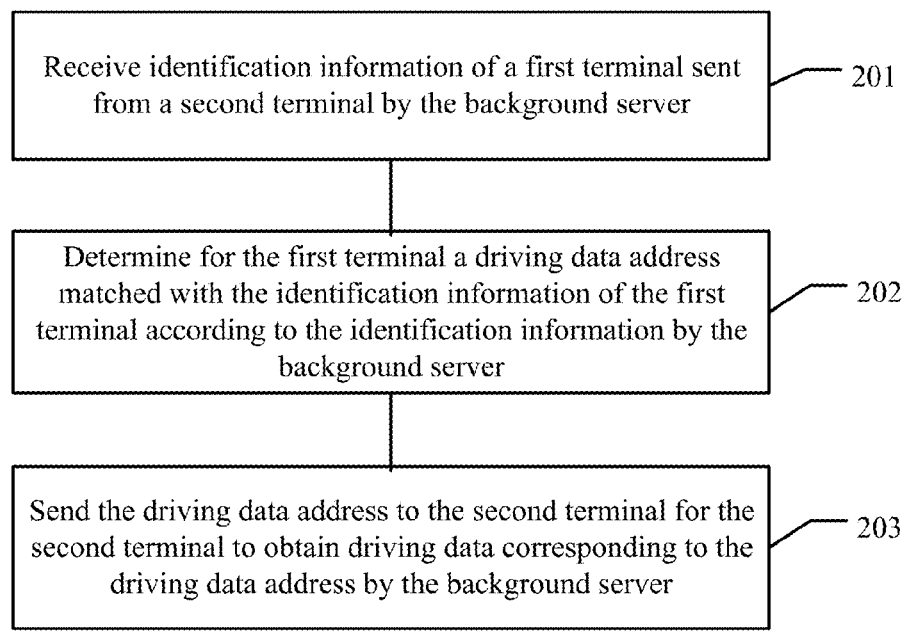
FIG. 2 is a schematic of another exemplary method for data processing in accordance with various embodiments.

FIG. 2 depicts another exemplary method for data processing in accordance with various disclosed embodiments.

In Step 201, a back-end server receives identification information of a first terminal sent from a second terminal.

In Step 202, the back-end server determines for the first terminal a driving data address matched with the identification information of the first terminal according to the identification information.

In Step 203, the back-end server sends the driving data address to the second terminal for the second terminal to obtain driving data corresponding to the driving data address.

As disclosed, the back-end server can receive identification information of a first terminal sent from a second terminal; determine for the first terminal a driving data address matched with the identification information of the first terminal according to the identification information; and send the driving data address to the second terminal for the second terminal to obtain driving data corresponding to the driving data address. Compared with conventional technology for loading driving data, the disclosed method can decrease complexity for loading the driving data of the first terminal.

Optionally, referring back to FIG. 2, the exemplary method for data processing can further include: receiving a loading success notification message sent from the second terminal; determining whether the identification information of the first terminal is stored; and when the identification information of the first terminal is not stored, correlating the identification information of the first terminal with the driving data address, and storing the correlated identification information of the first terminal and the driving data address.

In various embodiments, the driving data sent from the second terminal to the first terminal may not completely match with the hardware type of the first terminal. The driving data then may or may not be successfully loaded. When successfully loaded, the driving data is indicated to be matched with the hardware type of the first terminal. In some cases, the back-end server may have saved the mapping relationship between the VID/PID of the first terminal and the driving data address and there is no need to store the mapping relationship on the back-end server. In other cases, the back-end server may not have saved the mapping relationship between the VID/PID of the first terminal and the driving data address and there is a need to store the mapping relationship on the back-end server for next use.

In various embodiments, the back-end server can obtain a success/failure ratio for installing a generic driving and specific driving, from a success rate for driver installation in a daily report from the second terminal, and can obtain an automated analysis on the driver installation log in the daily report. For example, variance and the Bayesian formula may be used as follows.

Variance is an average number of the square of a difference between an individual data ($x_i$) with an average data ($\bar{x}$). In probability theory and mathematical statistics, the variance is used to measure a deviation degree between a random variable and its mathematical expectation (e.g., average). In statistics of the success rate for daily driver installation, mathematical principles regarding variance can be used.

$$\sigma^2 = \frac{1}{N} \sum_{i=1}^{N} (x_i - \bar{x})^2$$

The Bayesian formula can be: $P(A|B)=P(B|A)*P(A)/P(B)$ or $P(B|A)=P(A|B)*P(B)/P(A)$. Bayesian formula gives a relationship between the probabilities of A and B, $P(A)$ and $P(B)$, and the conditional probabilities of A given B and B given A, $P(A|B)$ and $P(B|A)$.

For example, the daily driving report can include about 60% of regular mobile phones and about 40% of counterfeit mobile phones. In this case, A=60%, B=40%, and when substituting these two values into the Bayesian formula, the probability (P) for using a generic driver and a specified driver can be respectively calculated for this mobile phone when a statistical sample is randomly selected.

Figure 3:
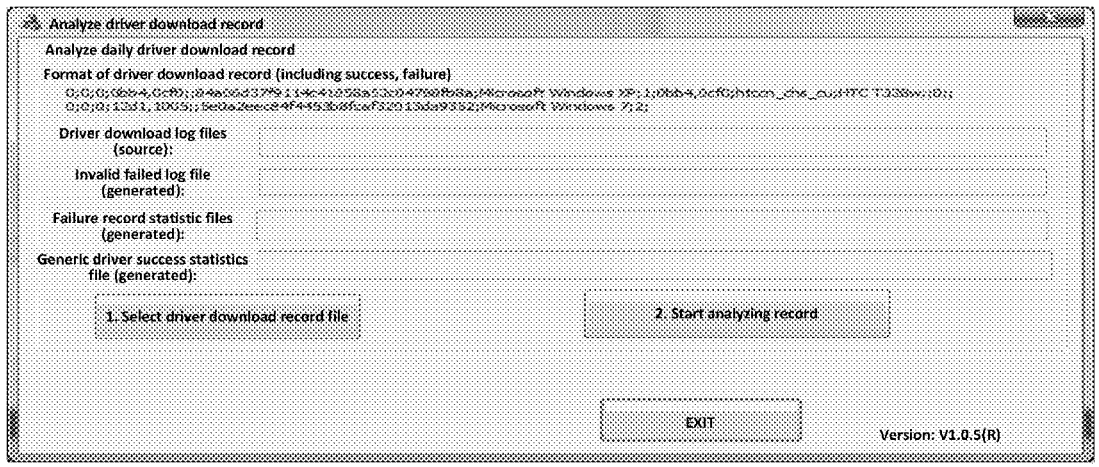
FIG. 3 is a schematic of another exemplary method for data processing in accordance with various embodiments.

In addition, the back-end server can use automated analysis tools to perform longitudinal statistical analysis (e.g., historical statistics) and transverse statistical analysis (e.g., daily statistics) and the following information can be obtained as shown in FIG. 3. FIG. 3 depicts an exemplary interface of an automated analysis tool. As shown, contents that may be analyzed can include driver download log files (source), invalid failed log file (generated), failure record statistic files (generated), and/or generic driver success statistics file (generated).

Optionally, referring back to FIG. 2, the exemplary method for data processing can further include: receiving a one of the VID/PID and at least one descriptor of the first terminal.

Figure 4:
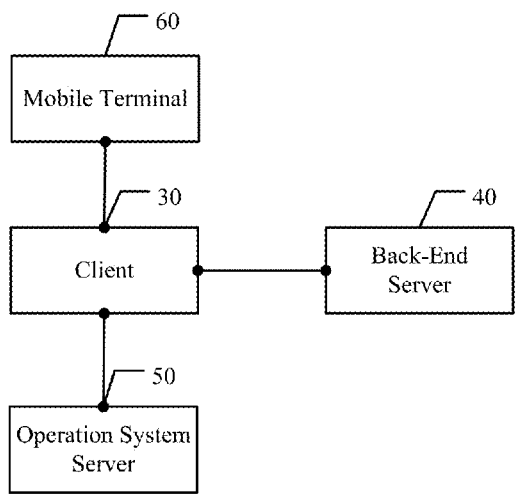
FIG. 4 is a schematic of another exemplary method for data processing in accordance with various embodiments.

FIG. 4 is a schematic of another exemplary method for data processing in accordance with various embodiments.

After a second terminal 30 establishes a communication connection with a first terminal 60 via a USB interface, the second terminal 30 reads the VID and/or PID of the first terminal 60. For example, the VID can be 22b8 and the PID can be 4284, the second terminal 30 can send the read VID 22b8 and PID 4284 to the back-end server 40 via a driving request. When the back-end server 40 is informed that the second terminal 30 needs to obtain the driving data, the back-end server 40 searches for the driving data address corresponding to the VID 22b8 and PID 4284 in the driving table according to the VID 22b8 and PID 4284. For example, the back-end server 40 can search in table 1 according the VID 22b8 and PID 4284.

TABLE 1

Driving Table

| VID | PID | Operation System | CPU Bit | Debug mode | Driving Address | Hareware Identification |
|---|---|---|---|---|---|---|
| 22b8 | 4284 | winxp | 64 | 1 | /phone_driver/motoroia_64_xp.zip | USBVID_22b8&PID_4284MI04 |
| 22b8 | 4284 | win7 | 32 | 1 | /phone_driver/motoroia_32_win7.zip | USBVID_22b8&PID_4284MI04 |
| 22b8 | 4284 | win7 | 64 | 1 | /phone_driver/motoroia_64_win7.zip | USBVID_22b8&PID_4284MI04 |
| 22b8 | 4286 | winxp | 32 | 1 | /phone_driver/motoroia_32_xp_win7.zip | USBVID_22b8&PID_4286MI01 |
| 22b8 | 4286 | winxp | 64 | 1 | /phone_driver/motoroia_64_xp.zip | USBVID_22b8&PID_4286MI01 |
| 22b8 | 4286 | win7 | 32 | 1 | /phone_driver/motoroia_32_xp_win7.zip | USBVID_22b8&PID_4286MI01 |
| 22b8 | 4286 | win7 | 64 | 1 | /phone_driver/motoroia_64_win7.zip | USBVID_22b8&PID_4286MI01 |
| 22b8 | 41DA | win7 | 32 | 1 | /phone_driver/motoroia_32_win7.zip | USBVID_22b8&PID_41DAMI04 |
| 22b8 | 41DA | win7 | 64 | 1 | /phone_driver/motoroia_64_win7.zip | USBVID_22b8&PID_41DAMI04 | loading failure notification message sent from the second terminal; determining for the first terminal a back-up driving data address matched with the identification information of the first terminal according to the identification information of the first terminal; and sending the back-up driving data address to the second terminal for the second terminal to obtain back-up driving data corresponding to the back-up driving data address.

In various embodiments, when the first terminal fails to load the driving data, the driving data is not indicated to be matched with the first terminal. When receiving the loading failure notification message, the back-end server can determine the back-up driving data address matched with the VID/PID according to the VID/PID of the first terminal, such that the back-up driving data corresponding to the back-up driving data address can be loaded by the first terminal.

Optionally, referring back to FIG. 2, the exemplary method for data processing can further include: receiving one or more descriptors of the first terminal sent from the second terminal; and correlating the identification information of the first terminal with at least one descriptor of the one or more descriptors, and storing the correlated identification information and the at least one descriptor.

In various embodiments, the descriptor of the first terminal includes: a first terminal mode, a first terminal type, a first terminal brand name, a first terminal device type, a first terminal resolution, a first terminal operation system, and/or a first terminal CPU number of bits.

The back-end server can store the mapping relationship table between the driving data address and the VID/PID, and can also store a mapping relationship table between at least For illustration purposes, data shown in Table 1 are exemplary, and one of ordinary skill in the art would understand that more data for VID/PID and their driving address can be encompassed in Table 1.

For example, when only VID 22b8 and PID 4284 are included in the driving request, three corresponding driving addresses can be found in Table 1. When the driving request further includes information of operation system winxp and 64-bit, a unique driving address can be found accurately, as shown in Table 1: /phone_driver/motoroia_64_xp.zip. When multiple driving addresses are found, the back-end server 40 can determine a determined driving address to send to the second terminal 30. When correlated driving address of the VID 22b8 and PID 4284 is not stored on the back-end server 40, the back-end server 40 can re-search for device type library table, which contains type and brand that are correlated to the VID/PID, and determine a driving address according the type and brand. Table 2 is an exemplary device type library table.

TABLE 2

Type Library Table

| VID | PID | Brand | Type | Resolution |
|---|---|---|---|---|
| 1200 | 1234 | HTC | G8 | 320-480 |
| 18d1 | 4e22 | google | Nexus S | 480-800 |
| 0bb | 0cab | Htc_asia_wwe | HTC Desire S | 480-800 |
| 17ef | 7435 | lenovo | Lenovo A520GRAY | 480-800 |
| 17ef | 7401 | google | Nexus S | 480-800 |
| 04e8 | 6860 | samsung | GT-P7500 | 1280_800 |

Of course, when using VID and PID as an index, or only using VID as the index, a driving address can be determined for the first terminal via a fuzzy query. In addition to the exemplary driving Table 1 and the exemplary type library Table 2, the back-end server can further include other mapping tables including, e.g., a VID driving table, a mobile phone brand table, a device type table, and/or a back-up driving configuration table as shown in Tables 3-6.

TABLE 3

VID Driving Table

| VID | PC Operation System | CPU Type (Number of bits) | Downloading Address |
|---|---|---|---|
| 1256 | winxp | 32 | www.qq.com |
| 19d2 | winxp | 32 | /phone_driver/default/Generic.zip |
| 12d1 | winxp | 64 | /phone_driver/default/_base_64_v4.zip |
| 12d1 | winxp | 32 | /phone_driver/default/Generic.zip |

TABLE 4

Mobile Phone Brand Name

| VID | Brand Name (English) | Brand Name (Chinese) |
|---|---|---|
| 12d1 | Huawei | 华为 |
| 4545 | HTC | |
| 8888 | HTC | |
| 888F | HTC | |
| 8A8F | HTC | |
| 413c | Dell | Dell |
| 18d1 | Google | Google/ Google/魅族/小米 |
| 0bb4 | Google | |
| 17ef | Google | |
| 109b | | |
| 04e8 | Samsung | |
| 22b8 | Motolola | 摩托 |
| 1004 | LG | LG |
| 0409 | NEC | NEC |

TABLE 5

Device Type Table

| VID | PID | Brand Name | Type |
|---|---|---|---|
| 04cc | 2323 | Lenovo | Lenovo S899t |
| 04e8 | 681c | Samsung | GT-19000 |
| 04e8 | 681c | Samsung | GT-19003 |

TABLE 5-continued

Device Type Table

| VID | PID | Brand Name | Type |
|---|---|---|---|
| 04e8 | 681c | Samsung | GT-19018 |
| 04e8 | 685e | Samsung | GT-19100G |
| 04e8 | 685e | Samsung | GT-19003 |
| 04e8 | 685e | Samsung | GT-S5360 |
| 04e8 | 685e | Samsung | GT-S5368 |
| 04e8 | 685e | Samsung | GT-S5820 |
| 04e8 | 685e | Samsung | GT-S5830i |
| 04e8 | 685e | Samsung | GT-S6102E |
| 04e8 | 685e | Samsung | GT-S6108 |
| 04e8 | 685e | Samsung | GT-S6352 |

TABLE 6

Back-Up Driving Table

| VID | PID | Operation System | CPU Number of Bits | Downloading Address | Descriptor |
|---|---|---|---|---|---|
| 04E8 | 681C | winxp | 32 | /phone_driver/batch/android_driver/d_base_32_v4.zip | Samsung |
| 04E8 | 681C | win7 | 32 | /phone_driver/batch/android_driver/d_base_32_v4.zip | Samsung |
| 12d1 | 1035 | winxp | 32 | /phone_driver/batch/android_driver/d_base_32_v4.zip | Huawei |
| 12d1 | 1031 | winxp | 32 | /phone_driver/batch/android_driver/d_base_32_v4.zip | Huawei |
| 12d1 | 1031 | win7 | 32 | /phone_driver/batch/android_driver/d_base_32_v4.zip | Huawei |
| 12d1 | 1035 | win7 | 32 | /phone_driver/batch/android_driver/d_base_32_v4.zip | Huawei |
| 04E8 | 689E | winxp | 64 | /phone_driver/batch/android_driver/d_f_04e8_2678_64.zip | SamsungS5660 |
| 04E8 | 689E | winxp | 32 | /phone_driver/batch/android_driver/d_f_04e8_dbbe_32.zip | SamsungS5660 |
| 04E8 | 689E | win7 | 32 | /phone_driver/batch/android_driver/samsung_689C_689E.zip | SamsungS5660 |
| 04E8 | 689E | win7 | 64 | /phone_driver/batch/android_driver/d_f_04e8_2678_64.zip | SamsungS5660 |

In Tables 1-6, the PC driving list can contain fields including ID of VID, ID of PID, whether it is on a debugging status, driver download address, operation system, CPU number of bits, and other suitable information. The device type library table can contain fields including ID of vendor, ID of product, mobile phone brand name, device type, mobile phone resolution, and other suitable information.

The VID driving table can contain fields including ID of VID, PC operation system, CPU type (number of bits), mobile phone driver download address, and other suitable information. The mobile phone brand name table can contain fields including mobile phone VID, mobile phone English brand name, mobile phone brand name, and other suitable information.

The device type (with no resolution) table can contain fields including mobile phone VID, mobile phone PID, mobile phone brand name, mobile phone type, and other suitable information.

The back-up driving configuration table mainly can contain fields including VID, PID, PC operation system, CPU type (number of bits), driving program download address, descriptor, and other suitable information. Each table described herein can further contain information associated with the VID and PID, or any desired information.

After the back-end server 40 determines the driving address, the driving address can be sent to the second terminal 30. The second terminal 30 can download corresponding driving data from a server storing the driving address. The driving data can be stored in the back-end server 40 or any other suitable server.

After the second terminal 30 obtains the driving data, the second terminal 30 can send the driving data to the first terminal 60 for the first terminal 60 to load.

After the driving data of the first terminal are successfully loaded, the second terminal 30 can send the back-end server 40 a loading success notification message, such that the back-end server 40 can be informed that the driving data address is matched with the VID/PID. When a mapping relationship between the VID/PID and the driving data address is not stored on the back-end server 40, the VID/PID and the driving data address can be correlated and can be stored after the correlation.

When the driving data of the first terminal fail to be loaded, a loading failure notification message can be sent from the second terminal 30 to the back-end server 40, such that the back-end server 40 can be informed that the driving data address is not matched with the VID/PID. The back-end server 40 can select another driving address from the back-up driving configuration table and send to the second terminal for the first terminal 60 to install the driver.

When the first terminal 60 successfully loads the driving data, the first terminal needs to load other data to be loaded including, e.g., a game software product. Because the data to be loaded is related with the resolution of the first terminal, the second terminal 30 can obtain the resolution of the first terminal from the operation system server. The operation system server 50 can obtain multiple descriptors from the first terminal including, for example, a first terminal mode, a first terminal type, a first terminal brand name, a first terminal device type, a first terminal resolution, a first terminal operation system, and/or a first terminal CPU number of bits.

The second terminal cannot obtain the above-mentioned information from the first terminal directly. The second terminal 30 needs to obtain one or more descriptors from the operation system server, then sends the one or more descriptors to the back-end server to correlate the identification information of the first terminal with at least one descriptor of the one or more descriptors, and then stores the correlated identification information and the at least one descriptor.

The second terminal 30 can obtain data to be loaded corresponding to the resolution and an identification of the data to be loaded, according to the resolution of the first terminal and the identification of data to be loaded. The second terminal 30 can send the data to be loaded to the first terminal for the first terminal to load.

Figure 5:
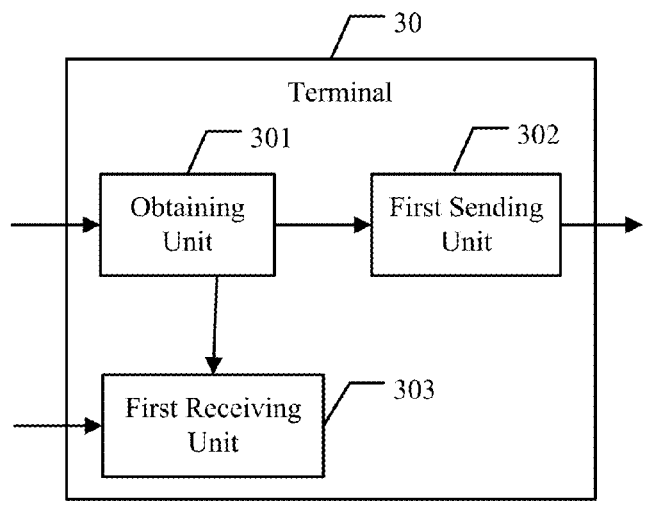
FIG. 5 is a schematic of an exemplary terminal in accordance with various embodiments.

Referring to FIG. 5, an exemplary terminal 30 can include: an obtaining unit 301, a first sending unit 302, and/or a first receiving unit 303.

The obtaining unit 301 is configured to obtain identification information of a first terminal after establishing a connection with the first terminal. The first sending unit 302 is configured to send the identification information of the first terminal obtained by the obtaining unit 301 to the back-end server, such that the back-end server determines a driving data address matched with the identification information of the first terminal according to the identification information.

The first receiving unit 303 is configured to receive the driving data address sent from the back-end server. The obtaining unit 301 is further configured to obtain driving data corresponding to the driving data address received by the first receiving unit 303. The first sending unit 302 is further configured to send the driving data to the first terminal for the first terminal to load the driving data.

As disclosed, after establishing a connection with the first terminal, the obtaining unit 301 obtains the identification information of the first terminal. The first sending unit 302 sends the identification information of the first terminal obtained by the obtaining unit 301 to the back-end server, such that the back-end server determines for the first terminal the driving data address matched with the identification information of the first terminal according to the identification information. The first receiving unit 301 receives the driving data address sent from the back-end server, and the obtaining unit 301 obtains the driving data corresponding to the driving data address received by the receiving unit 303. The first sending unit 302 further sends the driving data to the first terminal for the first terminal to load the driving data. Compared with conventional technology for loading driving data, the disclosed method can decrease complexity for loading the driving data of the first terminal.

Optionally, as shown in FIG. 5, the first sending unit 302 is further configured, after the first terminal successfully loads the driving data, to send a loading success notification message to the back-end server, such that when the back-end server determines that the identification information of the first terminal is not stored, the back-end server correlates the identification information of the first terminal with the driving data address, and stores the correlated identification information and driving data address.

Optionally, according to FIG. 5, the first sending unit 302 is further configured, after the first terminal fails to load the driving data, to send a loading failure notification message to the back-end server, such that the back-end server determines a back-up driving data address matched with the identification information of the first terminal according to the identification information of the first terminal.

The first receiving unit 303 is further configured to receive the back-up driving data address sent from the back-end server.

The obtaining unit 301 is further configured to obtain back-up driving data corresponding to the back-up driving data address received by the first receiving unit 303.

The first sending unit 302 is further configured to send the back-up driving data to the first terminal for the first terminal to load the back-up driving data.

Optionally, according to FIG. 5, the obtaining unit 301 is further configured to obtain a resolution of the first terminal from the operation system server and, according to the resolution of the first terminal and the identification of data to be loaded, obtain the data to be loaded corresponding to the resolution and the identification of the data to be loaded.

The first sending unit 302 is further configured to send the data to be loaded to the first terminal for the first terminal to load the data to be loaded.

Optionally, according to FIG. 5, the obtaining unit 301 is further configured to obtain one or more descriptors of the first terminal from an operation system server.

The first sending unit 302 is further configured to send the one or more descriptors to the back-end server for the back-end server to correlate the identification information of the first terminal with at least one descriptor of the one or more descriptors, and to store the correlated identification information and the at least one descriptor.

Figure 6:
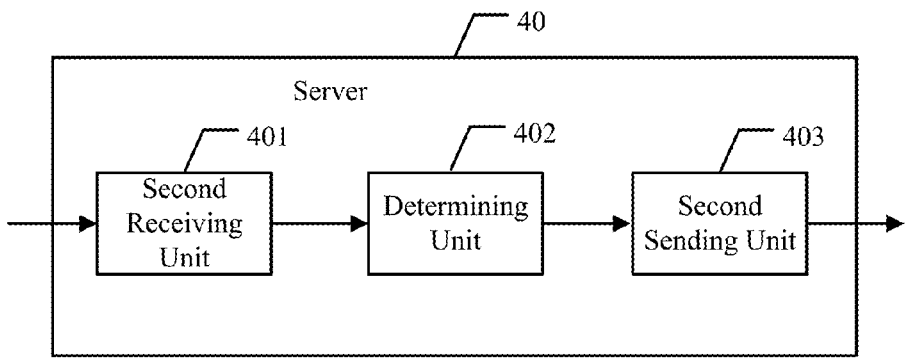
FIG. 6 is a schematic of an exemplary server in accordance with various embodiments.

Referring to FIG. 6, an exemplary server 40 includes: a second receiving unit 401, a determining unit 402, and/or a second sending unit 403.

The second receiving unit 401 is configured to receive identification information of first terminal sent from a second terminal. The determining unit 402 is configured to determine for the first terminal a driving data address matched with the identification information of the first terminal according to the identification information received by the second receiving unit 401.

The second sending unit 403 is configured to send the driving data address determined by the determining unit 402 to the second terminal for the second terminal to obtain driving data corresponding to the driving data address.

As disclosed, the second receiving unit 401 receives the identification information of a first terminal sent from the second terminal. The determining unit 402 determines for the first terminal a driving data address matched with the identification information of the first terminal according to the identification information received from the second receiving unit 401. The second sending unit 403 sends the driving data address determined by the determining unit 402 to the second terminal for the second terminal to obtain driving data corresponding to the driving data address. Compared with conventional technology for loading driving data, the disclosed method can decrease complexity for loading the driving data of the first terminal.

Figure 7:
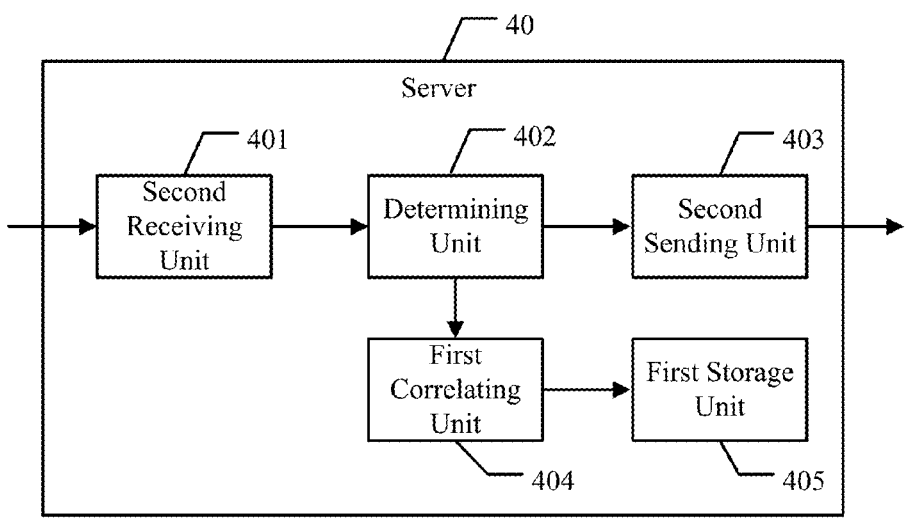
FIG. 7 is a schematic of another exemplary server in accordance with various embodiments.

Optionally, FIG. 7 depicts another exemplary sever to provide a first correlating unit 401 and a first storage unit 405 based on the exemplary sever depicted in FIG. 6.

The second receiving unit 401 is further configured to receive a loading success notification message sent from the second terminal. The determining unit 402 is further configured to determine whether the identification information of the first terminal is stored.

The first correlating unit 404 is configured to correlate the identification information of the first terminal with the driving data address, when the determining unit determines the identification information of the first terminal is not stored. The first storing unit 405 is configured to store the identification information of the first terminal and the driving data address correlated by the first correlating unit 404.

Optionally, according to FIG. 6 and/or FIG. 7, the second receiving unit 401 is further configured to receive a loading failure notification message sent from the second terminal.

The determining unit 402 is further configured to determine for the first terminal a back-up data address matched with the identification information of the first terminal, according to the identification information of the first terminal. The second sending unit 403 is further configured to send the back-up driving data address to the second terminal for the second terminal to obtain back-up driving data corresponding to the back-up driving data address.

Figure 8:
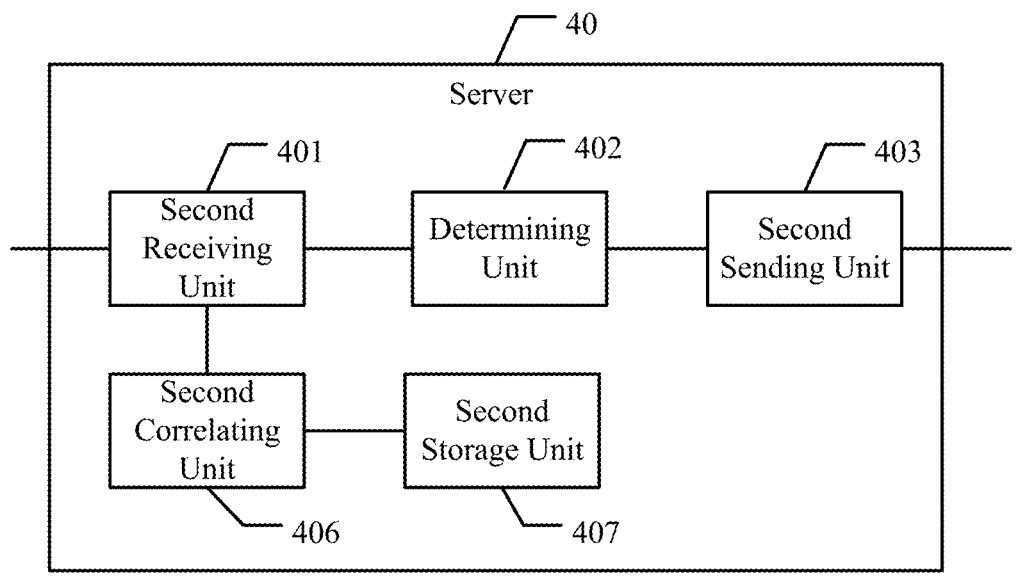
FIG. 8 is a schematic of another exemplary server in accordance with various embodiments.

Optionally, FIG. 8 depicts another exemplary sever to provide a second correlating unit 406 and a second storage unit 407, based on the exemplary sever 40 depicted in FIG. 6.

The second receiving unit 401 is further configured to receive one or more descriptors of the first terminal sent from the second terminal. The second correlating unit 406 is configured to correlate the identification information of the first terminal with at least one of the one or more descriptors received by the second receiving unit. The second storing unit 407 is configured to store the identification information and the at least one descriptor correlated by the second correlating unit.

Figure 9:
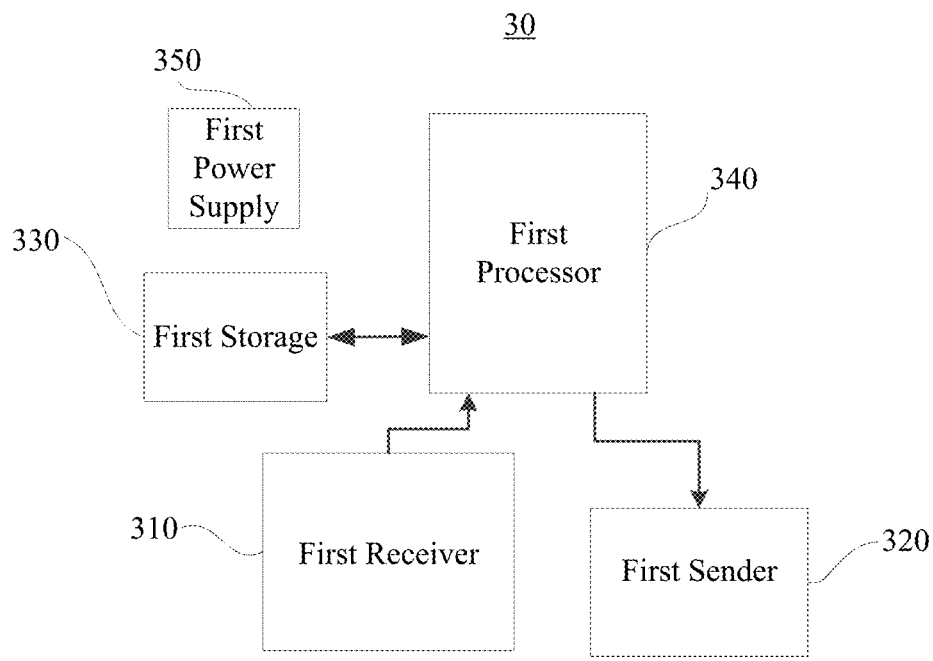
FIG. 9 is a schematic of another exemplary terminal in accordance with various embodiments.

FIG. 9 depicts an exemplary second terminal, e.g., used to implement the methods described herein. As shown in FIG. 9, the exemplary second terminal 30 includes a first receiver 310, a first sender 320, a first storage device 330, and/or a first processor 340. The first receiver 310, the first sender 320, the first storage device 330 and the first processor 340 can be connected via bus or any other suitable mode.

The first storage device 330 includes one or more computer-readable storage medium. At least one first processor 340 may be included. The second terminal 30 may further include a first power supply 350 and other components. More components can be added to FIG. 9 and some components can be omitted from FIG. 9. Some components can be combined and/or configured as desired.

The first storage device 330 can be configured to store software programs and/or modules (modules). The first processor 340 is configured to run software programs and modules stored in the first storage device 330 and thus to perform various functional applications and data processing. The first storage device 330 mainly contains a program storage area and a data storage area. The program storage area can include an operation system, and an application program required by at least one function. In addition, the first storage device 330 can further contain a high-speed random access memory and nonvolatile storage including e.g., at least one disk memory device, flash memory device, and/or other nonvolatile storage. The first storage device 330 can include a first storage controller to provide first storage device 330 with an access from the first processor 340 and the first receiver 310.

The first processor 340 can be a control center of the second terminal 30 using various interfaces and circuitry to connect all parts of the second terminal 30. By running or executing software programs and/or modules stored in the first storage device 330 and by calling data stored in the first storage device 330, the first processor 340 can perform various functions and process data as a proxy server. Optionally, the first processor 340 can include one or more processing cores. For example, the first processor 340 can integrate applications, and modulation and demodulation of the first processor.

The second terminal 30 can further include a first power supply 350 (e.g., a battery) to supply power to each component. In one embodiment, the power supply can use a power management system to be logically coupled to the first processor 340 for the power management system to manage charging, discharging, power managing, and other functions. The first power supply 350 may also include one or more AC or DC power supplies, a recharging system, a power failure detection circuit, a power converter or inverter, a power status indicator, etc.

The first receiver 310 is configured to obtain the identification information of the first terminal after establishing a connection with the first terminal.

The first sender 320 is configured to send the driving request containing the identification information of the first terminal to the back-end server, such that the back-end server determines a driving data address matched with the identification information of the first terminal according to the identification information.

The first receiver 310 is configured to receive the driving data address sent from the back-end server, and obtain the driving data corresponding to the driving data address. The first sender 320 is further configured to send the driving data to the first terminal for the first terminal to load the driving data.

In various embodiments, the first sender 320 is further configured, after the first terminal successfully loads the driving data, to send a loading success notification message to the back-end server, such that when the back-end server determines that the identification information of the first terminal is not stored, the back-end server correlates the identification information of the first terminal with the driving data address, and stores the correlated identification information and driving data address.

In some embodiments, the first sender 320 is further configured, after the first terminal fails to load the driving data, to send a loading failure notification message to the back-end server, such that the back-end server determines a back-up driving data address matched with the identification information of the first terminal according to the identification information of the first terminal.

The first receiver 310 is further configured to receive the back-up driving data address sent from the back-end server, and obtain back-up driving data corresponding to the back-up driving data address. The first sender 320 is further configured to send the back-up driving data to the first terminal for the first terminal to load the back-up driving data.

In various embodiments, the first receiver 310 is further configured to obtain the resolution of the first terminal from the operation system server and, according to the resolution of the first terminal and the identification of data to be loaded, to obtain the data to be loaded corresponding to the resolution and an identification of the data to be loaded.

The first sender 320 is further configured to send the data to be loaded to the first terminal for the first terminal to load the data to be loaded. In various embodiments, the first receiver 310 is further configured to obtain one or more descriptors of the first terminal from the operation system server.

The first sender 320 is further configured to send the one or more descriptors to the back-end server for the back-end server to correlate the identification information of the first terminal with at least one descriptor of the one or more descriptors, and to store the correlated identification information and the at least one descriptor.

Various embodiments also provide a computer-readable storage medium. The computer-readable storage medium may be a computer-readable storage medium included in the above described first storage device. The computer-readable storage medium may be configured alone without being configured into any terminal. The computer-readable storage medium can store one or more programs, the one or more programs can be implemented by one or more processors to perform a data processing method as disclosed herein.

In an exemplary method, after establishing a connection with a first terminal, a second terminal obtains identification information of the first terminal and sends a driving request containing the identification information of the first terminal to a back-end server, such that the back-end server determines for the first terminal a driving data address matched with the identification information of the first terminal according to the identification information. The second terminal receives the driving data address sent from the back-end server, and obtains driving data corresponding to the driving data address. The second terminal sends the driving data to the first terminal for the first terminal to load the driving data.

The disclosed method can also include: after the first terminal successfully loads the driving data, sending a loading success notification message the back-end server such that when the back-end server determines that the identification information of the first terminal is not stored, the back-end server correlates the identification information of the first terminal with the driving data address, and stores the correlated identification information and the driving data address.

The disclosed method can further include: after the first terminal fails to load the driving data, sending a loading failure notification message to the back-end server such that the back-end server determines a back-up driving data address matched with the identification information of the first terminal according to the identification information of the first terminal; receiving the back-up driving data address sent from the back-end server and obtaining back-up driving data corresponding to the back-up driving data address; and sending the back-up driving data to the first terminal for the first terminal to load the back-up driving data.

The disclosed method can still further include: obtaining the resolution of the first terminal from the operation system server; obtaining data to be loaded corresponding to the resolution and the identification of the data to be loaded, according to the resolution of the first terminal and the identification of data to be loaded; sending the data to be loaded to the first terminal for the first terminal to load the data to be loaded.

The disclosed method can still further include: obtaining one or more descriptors of the first terminal from the operation system server; sending the one or more descriptors to the back-end server for the back-end server to correlate the identification information of the first terminal with at least one descriptor of the one or more descriptors and to store the correlated identification information and the at least one descriptor.

Figure 10:
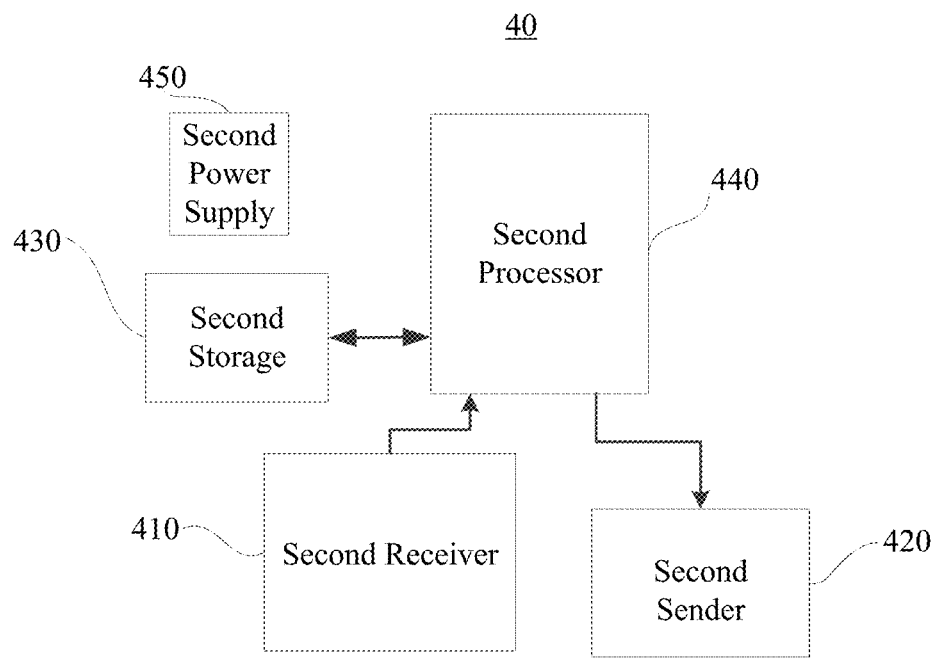
FIG. 10 is a schematic of another exemplary server in accordance with various embodiments.

Referring to FIG. 10, an exemplary server 40 includes a second receiver 410, a second sender 420, a second storage device 430, and/or a second processor 440. The second receiver 410, the second sender 420, the second storage device 430, and the second processor 440 can be connected via bus or other suitable mode.

The second storage device 430 includes one or more computer-readable storage medium. At least one second processor 440 may be included. The server 40 may further include a second power supply 450 and other components. More components can be added to FIG. 10 and some components can be omitted from FIG. 10. Some components can be combined and/or configured as desired.

The second storage device 430 can be configured to store software programs and/or modules (modules). The second processor 440 is configured to run software programs and modules stored in the second storage device 430 and thus to perform various functional applications and data processing. The second storage device 430 mainly contains a program storage area and a data storage area. The program storage area can include an operation system, and an application program required by at least one function. In addition, the second storage device 430 can further contain a high-speed random access memory and nonvolatile storage including e.g., at least one disk memory device, flash memory device, and/or other nonvolatile storage. The second storage device 430 can include a first storage controller to provide second storage device 430 with an access from the second processor 410 and the second receiver 430.

The second processor 440 can be a control center of the server 40 using various interfaces and circuitry to connect all parts of the server 40. By running or executing software programs and/or modules stored in the second storage device 430 and by calling data stored in the second storage device 430, the second processor 440 can perform various functions and process data as a proxy server. Optionally, the second processor 440 can include one or more processing cores. For example, the second processor 440 can integrate applications, and modulation and demodulation of the first processor.

The server 40 can further include a second power supply 450 (e.g., a battery) to supply power to each component. In one embodiment, the power supply can use a power management system to be logically coupled to the second processor 440 for the power management system to manage charging, discharging, power managing, and other functions. The second power supply 450 may also include one or more AC or DC power supplies, a recharging system, a power failure detection circuit, a power converter or inverter, a power status indicator, etc.

The second receiver 410 is configured to receive identification information of a first terminal sent from a second terminal. The second processor 440 is configured to determine for the first terminal a driving data address matched with the identification information of the first terminal according to the identification information.

The second sender 420 is configured to send the driving data address to the second terminal for the second terminal to obtain driving data corresponding to the driving data address. In various embodiments, the second receiver 410 is further configured to receive a loading success notification message sent from the second terminal.

The second processor 440 is configured to determine whether the identification information of the first terminal is stored; and when the identification information of the first terminal is not stored, to correlate the identification information of the first terminal with the driving data address.

The second storage device 430 is configured to store the correlated identification information of the first terminal and the driving data address. In various embodiments, the second receiver 410 is further configured to receive a loading failure notification message sent from the second terminal.

The second processor 440 is further configured to determine for the first terminal a back-up driving data address matched with the identification information for the first terminal according to the identification information of the first terminal.

The second sender 420 is further configured to send the back-up driving data address to the second terminal for the second terminal to obtain back-up driving data corresponding to the back-up driving data address.

In various embodiments, the second receiver 410 is further configured to receive one or more descriptors of the first terminal sent from the second terminal. The second processor 440 is further configured to correlate the identification information of the first terminal with at least one descriptor of the one or more descriptors. The second storage device 430 is further configured to store the correlated identification information and the at least one descriptor.

Various embodiments also provide a computer-readable storage medium. The computer-readable storage medium may be a computer-readable storage medium included in the above described first storage device. The computer-readable storage medium may be configured alone without being configured into any terminal. The computer-readable storage medium can store one or more programs, the one or more programs can be implemented by one or more processors to perform a data processing method as disclosed herein.

In an exemplary data processing method, identification information of a first terminal sent from a second terminal is received. A driving data address matched with the identification information of the first terminal is determined for the first terminal according to the identification information. The driving data address is sent to the second terminal for the second terminal to obtain driving data corresponding to the driving data address.

The method described above can also include receiving the loading success notification message sent from the second terminal; determining whether the identification information of the first terminal is stored or not; and when determining that the identification information of the first terminal is not stored, correlating the identification information of the first terminal with the driving data address, and storing the correlated identification information and the driving data address.

The method described above can further include receiving the loading failure notification message sent from the second terminal; determining a back-up driving data address matched with the identification information of the first terminal according to the identification information of the first terminal, and sending the back-up driving data address to the second terminal for obtaining back-up driving data corresponding to the back-up driving data address.

The method described above can still further include receiving one or more descriptors of the first terminal from the second terminal; correlating the identification information of the first terminal with at least one descriptor of the one or more descriptors and storing the correlated identification information and the at least one descriptor.

Figure 11:
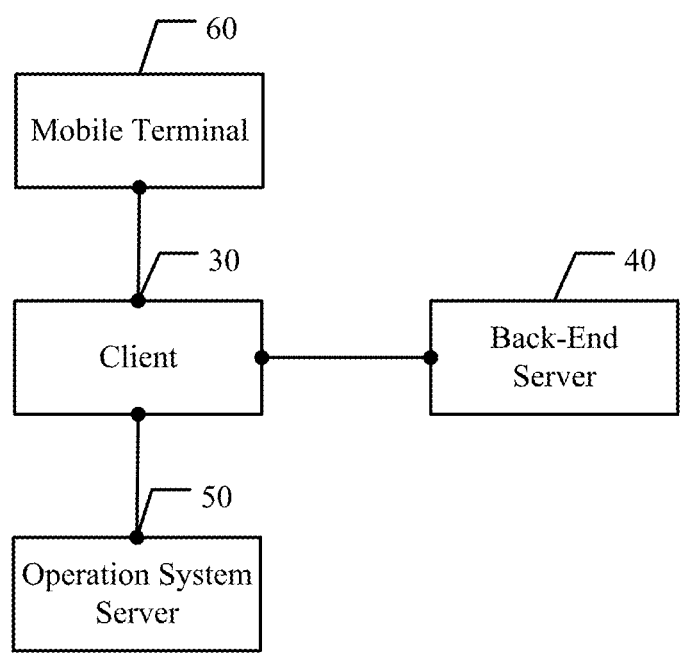
FIG. 11 is a schematic of an exemplary system in accordance with various embodiments.

Referring to FIG. 11, an exemplary data processing system is provided including a second terminal 30, a back-end server 40, an operation system server 50 and/or a first terminal 60.

The second terminal 30 can use USB interface to communicate and connect with the first terminal 60. The back-end server 40 can communicate and connect with the second terminal 30. The operation system server 50 can communicate and connect with each of the first terminal 60 and the second terminal 30.

The second terminal is configured, after establishing a connection with a first terminal, to obtain the identification information of the first terminal; to send a driving request containing the identification information of the first terminal to a back-end server, such that the back-end server determines for the first terminal a driving data address matched with the identification information of the first terminal according to the identification information; to receive the driving data address sent from the back-end server, to obtain driving data corresponding to the driving data address; and to send the driving data to the first terminal for the first terminal to load the driving data.

The back-end server 40 is configured to receive identification information of first terminal sent from the second terminal; determine for the first terminal the driving data address matched with the identification information of the first terminal according to the identification information; and send the driving data address to the second terminal for the second terminal to obtain driving data corresponding to the driving data address.

The modules and/or units included herein are described according to their functional logic, but are not limited to the above descriptions as long as the modules/units can implement corresponding functions. Further, the specific name of each functional unit is used for distinguishing from on another without limiting the protection scope of the present disclosure. In various embodiments, the disclosed modules/units can be configured in one apparatus or configured in multiple apparatus as desired. The modules/units disclosed herein can be integrated in one module/unit/apparatus or in multiple modules/units/apparatus. Each of the modules/units disclosed herein can be divided into one or more sub-modules/units, which can be recombined in any manner.

Note that suitable software and/or hardware (e.g., a universal hardware platform) may be included and used in the disclosed methods and apparatus. For example, the disclosed embodiments can be implemented by hardware only, which alternatively can be implemented by software products only. The software products can be stored in a computer-readable storage medium including, e.g., ROM/RAM, magnetic disk, optical disk, etc. The software products can include suitable commands to enable a terminal device (e.g., including a mobile phone, a personal computer, a server, or a network device, etc.) to implement the disclosed embodiments.

The term "comprising", "including" or any other variants thereof are intended to cover a non-exclusive inclusion, such that the process, method, article, or apparatus containing a number of elements also include not only those elements, but also other elements that are not expressly listed; or further include inherent elements of the process, method, article or apparatus. Without further restrictions, the statement "includes a . . . " does not exclude other elements included in the process, method, article, or apparatus having those elements.

The terminology used in the description of the invention herein is for the purpose of describing particular examples only and is not intended to be limiting of the invention. As used in the description of the invention and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

The embodiments disclosed herein are exemplary only. The order by which the foregoing examples of the present disclosure are presented merely reflects the convenience of description. It does not imply the preference among the examples. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

Methods, terminals, servers, and systems for data processing are provided. After establishing a connection with a first terminal, a second terminal obtains identification information of the first terminal and sends a driving request containing the identification information of the first terminal to a back-end server, such that the back-end server determines for the first terminal a driving data address matched with the identification information of the first terminal according to the identification information. The second terminal receives the driving data address sent from the back-end server, and obtains driving data corresponding to the driving data address. The second terminal sends the driving data to the first terminal for the first terminal to load the driving data.

A terminal can include an obtaining unit, a first sending unit, and/or a first receiving unit. A server can include a second receiving unit, a determining unit, and a second sending unit. Compared with conventional technology for loading driving data, the disclosed method can decrease complexity for loading the driving data of the first terminal.

What is claimed is:

1. A data processing method comprising:
   after establishing a connection with a first terminal, obtaining, by a second terminal, an identification information of the first terminal;
   sending, by the second terminal, a driving request containing the identification information of the first terminal to a back-end server, such that the back-end server determines for the first terminal a driving data address matched with the identification information of the first terminal according to the identification information;
   receiving, by the second terminal, the driving data address sent from the back-end server, and obtaining driving data corresponding to the driving data address;
   sending, by the second terminal, the driving data to the first terminal for the first terminal to load the driving data;
   when the first terminal successfully loads the driving data, sending, by the second terminal, a loading success notification message to the back-end server such that when the back-end server determines that the identification information of the first terminal is not stored, the back-end server correlates the identification information of the first terminal with the driving data address, and stores the correlated identification information and the driving data address;
   obtaining one or more descriptors of the first terminal from an operation system server; and
   sending the one or more descriptors to the back-end server for the back-end server to correlate the identification information of the first terminal with at least one descriptor of the one or more descriptors and to store the correlated identification information and the at least one descriptor;
   wherein:
   the back-end server maintains at least one table to store a plurality of driving data addresses matched with a plurality of identification information and the at least one descriptor correlated with the plurality of identification information; and
   the back-end server determines for the first terminal the driving data address matched with both the identification information of the first terminal and the at least one descriptor of the first terminal according to the at least one table.

2. The method according to claim 1, further including:
   after the first terminal fails to load the driving data, sending a loading failure notification message to the back-end server such that the back-end server determines a back-up driving data address matched with the identification information of the first terminal according to the identification information of the first terminal;

receiving the back-up driving data address sent from the back-end server and obtaining back-up driving data corresponding to the back-up driving data address; and sending the back-up driving data to the first terminal for the first terminal to load the back-up driving data.

3. The method according to claim 1, further including:

obtaining a resolution of the first terminal from the operation system server;

obtaining data to be loaded corresponding to the resolution and an identification of the data to be loaded, according to the resolution of the first terminal and the identification of data to be loaded; and sending the data to be loaded to the first terminal for the first terminal to load the data to be loaded.

4. The method according to claim 1, wherein:

the identification information includes at least one of a vendor identity (VID) and a product identity (PID);

types of the at least one descriptor include an operation system, a CPU type, a mobile phone brand name, a device type, and a mobile phone resolution; and the at least one table contains fields including the VID, the PID, the driving data address, and one or more descriptors.

5. The method according to claim 1, wherein:

when the back-end server does not find an exact match for the identification information of the first terminal, the back-end server applies a fuzzy match based on the identification information and the at least on descriptor to determine the driving data address.

6. The method according to claim 1, wherein:

types of the driving data include a generic driving data and a specific driving data; and when the back-end server does not find an exact match for the identification information of the first terminal, the back-end server sends the generic driving data to the second terminal.

7. The method according to claim 6, further comprising:

maintaining, by the back-end server, a driver installation log including at least information about the first terminal, the type of the driving data, and whether the first terminal successfully loads the driving data;

automatically analyzing, by the back-end server, the driver installation log; and obtaining, by the back-end server, a success rate for the generic driving data and a success rate of the specific driving data in a predetermined time period.

8. The method according to claim 7, wherein automatically analyzing, by the back-end server, the driver installation log further comprises:

automatically generating at least one of an invalid failed log file, a failure record statistic files, and a generic driver success statistics file.

9. The method according to claim 7, wherein automatically analyzing, by the back-end server, the driver installation log further comprises:

using an automated analysis tool to perform longitudinal statistical analysis based on historical data in the driver installation log; and using an automated analysis tool to perform transverse statistical analysis based on daily data in the driver installation log.

10. The method according to claim 7, wherein:

the statistical analysis includes data variance and the Bayesian formula.

11. The method according to claim 1, wherein:

the operation system server is configured to communicate with each of the first terminal and the second terminal.

12. A data processing method comprising:

receiving an identification information of a first terminal sent from a second terminal;

determining for the first terminal a driving data address matched with the identification information of the first terminal according to the identification information; and sending the driving data address to the second terminal for the second terminal to obtain driving data corresponding to the driving data address receiving a loading success notification message sent from the second terminal;

determining whether the identification information of the first terminal is stored;

when the identification information of the first terminal is not stored, correlating the identification information of the first terminal with the driving data address, and storing the correlated identification information and the driving data address;

receiving one or more descriptors of the first terminal sent from the second terminal; and correlating the identification information of the first terminal with at least one descriptor of the one or more descriptors, and storing the correlated identification information and the at least one descriptor;

wherein:

the back-end server maintains at least one table to store a plurality of driving data addresses matched with a plurality of identification information and the at least one descriptor correlated with the plurality of identification information; and the back-end server determines for the first terminal the driving data address matched with both the identification information of the first terminal and the at least one descriptor of the first terminal according to the at least one table.

13. The method according to claim 12, further including:

receiving a loading failure notification message sent from the second terminal;

determining for the first terminal a back-up driving data address matched with the identification information of the first terminal according to the identification information of the first terminal; and sending the back-up driving data address to the second terminal for the second terminal to obtain back-up driving data corresponding to the back-up driving data address.

14. A terminal comprising one or more processors, memory, and a plurality of program units stored in the memory and to be executed by the one or more processors, the plurality of program units comprising:

an obtaining unit configured to obtain an identification information of a first terminal after establishing a connection with the first terminal;

a first sending unit configured to send the identification information of the first terminal obtained by the obtaining unit to the back-end server such that the back-end server determines a driving data address matched with the identification information of the first terminal according to the identification information; and a first receiving unit configured to receive the driving data address sent from the back-end server, wherein:

the obtaining unit is further configured to obtain driving data corresponding to the driving data address received by the first receiving unit;

the first sending unit is further configured to send the driving data to the first terminal for the first terminal to load the driving data;

the first sending unit is further configured, after the first terminal successfully loads the driving data, to send a loading success notification message to the back-end server such that when the back-end server determines that the identification information of the first terminal is not stored, the back-end server correlates the identification information of the first terminal with the driving data address, and stores the correlated identification information and driving data address;

the obtaining unit is further configured to obtain one or more descriptors of the first terminal from an operation system server;

the first sending unit is further configured to send the one or more descriptors to the back-end server for the back-end server to correlate the identification information of the first terminal with at least one descriptor of the one or more descriptors, and to store the correlated identification information and the at least one descriptor;

the back-end server maintains at least one table to store a plurality of driving data addresses matched with a plurality of identification information and the at least one descriptor correlated with the plurality of identification information; and the back-end server determines for the first terminal the driving data address matched with both the identification information of the first terminal and the at least one descriptor of the first terminal according to the at least one table.

15. The terminal according to claim 14, wherein the first sending unit is further configured, after the first terminal fails to load the driving data, to send a loading failure notification message to the back-end server such that the back-end server determines a back-up driving data address matched with the identification information of the first terminal according to the identification information of the first terminal;

the first receiving unit is further configured to receive the back-up driving data address sent from the back-end server;

the obtaining unit is further configured to obtain back-up driving data corresponding to the back-up driving data address received by the first receiving unit; and the first sending unit is further configured to send the back-up driving data to the first terminal for the first terminal to load the back-up driving data.

16. The terminal according to claim 14, wherein:

the obtaining unit is further configured to obtain a resolution of the first terminal from the operation system server and, according to the resolution of the first terminal and data to be loaded, to obtain the data to be loaded corresponding to the resolution and an identification of the data to be loaded; and the first sending unit is further configured to send the data to be loaded to the first terminal for the first terminal to load the data to be loaded.

17. A server comprising one or more processors, memory, and a plurality of program units stored in the memory and to be executed by the one or more processors, the plurality of program units comprising:

a second receiving unit configured to receive an identification information of first terminal sent from a second terminal;

a determining unit configured to determine for the first terminal a driving data address matched with the identification information of the first terminal according to the identification information received by the second terminal; and a second sending unit configured to send the driving data address determined by the determining unit to the second terminal for the second terminal to obtain driving data corresponding to the driving data address;

wherein:

the second receiving unit is further configured to receive a loading success notification message sent from the second terminal;

the determining unit is further configured to determine whether the identification information of the first terminal is stored;

the first correlating unit is configured to correlate the identification information of the first terminal with the driving data address, when the determining unit determines the identification information of the first terminal is not stored;

the first storing unit is configured to store the identification information of the first terminal and the driving data address correlated by the correlating unit the second receiving unit is further configured to receive one or more descriptors of the first terminal sent from the second terminal;

the second correlating unit is configured to correlate the identification information of the first terminal with at least one of the one or more descriptors received by the second receiving unit;

the second storing unit is configured to store the identification information and the at least one descriptor correlated by the second correlating unit;

the back-end server maintains at least one table to store a plurality of driving data addresses matched with a plurality of identification information and the at least one descriptor correlated with the plurality of identification information; and the back-end server determines for the first terminal the driving data address matched with both the identification information of the first terminal and the at least one descriptor of the first terminal according to the at least one table.

18. The server according to claim 17, wherein:

the second receiving unit is further configured to receive a loading failure notification message sent from the second terminal;

the determining unit is further configured to determine for the first terminal a back-up data address matched with the identification information of the first terminal, according to the identification information of the first terminal; and the second sending unit is further configured to send the back-up driving data address to the second terminal for the second terminal to obtain back-up driving data corresponding to the back-up driving data address.

19. A data processing system including: a first terminal, a second terminal including the terminal according to claim 14, an operation system server, and a back-end server.

20. A data processing system including: a first terminal, a second terminal, an operation system server, and a back-end server including the server according to claim 17.

* * * * *